Nov. 7, 1967  R. L. RENISH  3,350,842
CAPPING MACHINE
Filed March 22, 1965  3 Sheets-Sheet 1
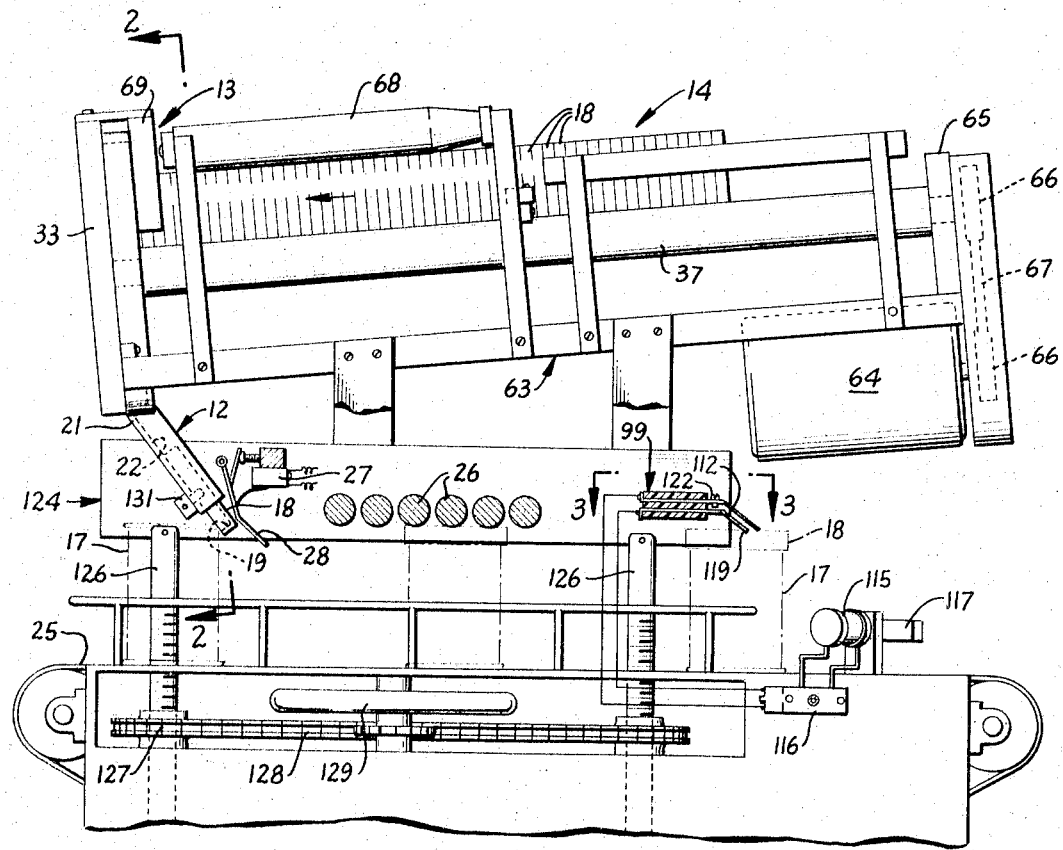
FIG. 1.
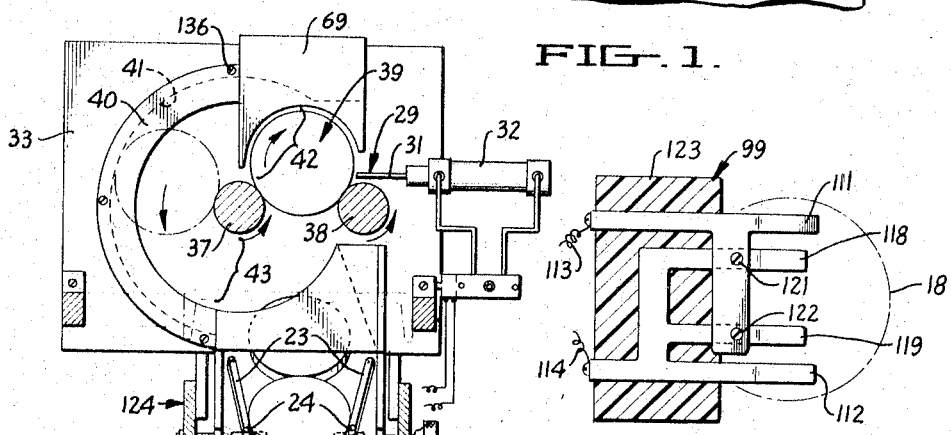
FIG. 2.  FIG. 3.
INVENTOR.
ROBERT L. RENISH
BY
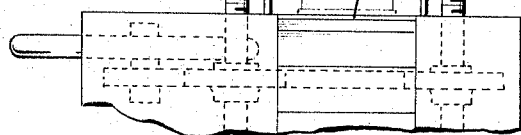
ATTORNEYS

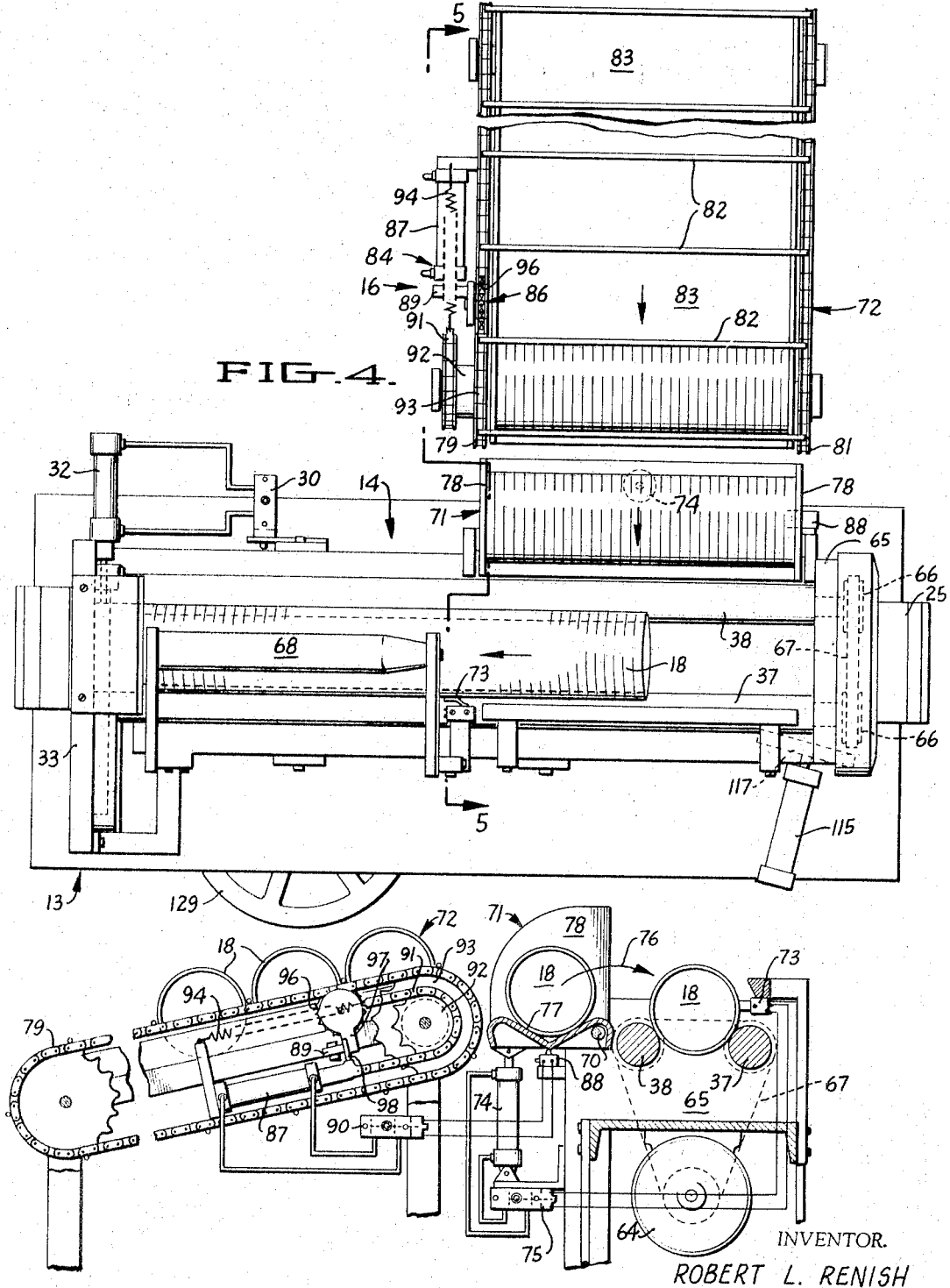

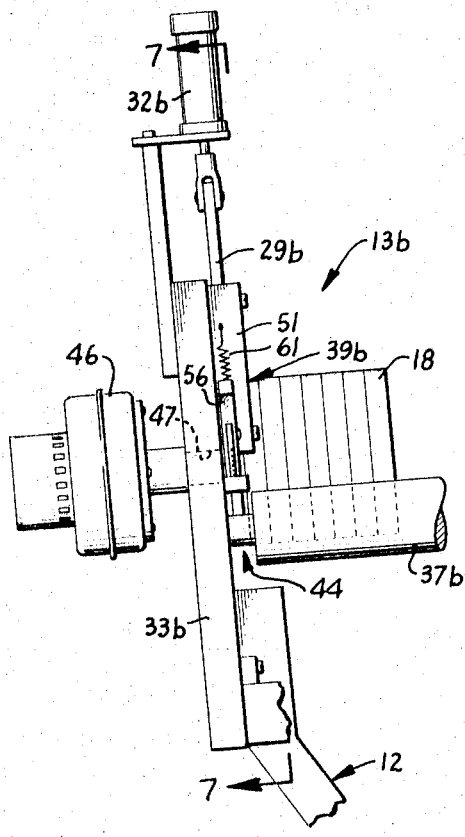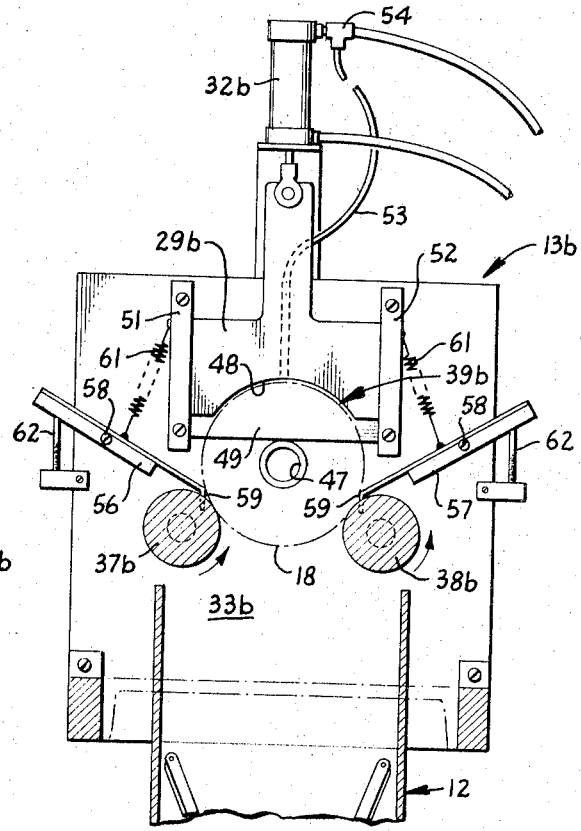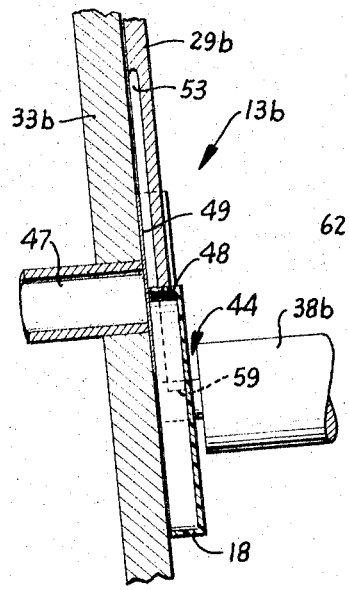

United States Patent Office 3,350,842
Patented Nov. 7, 1967

3,350,842
CAPPING MACHINE
Robert L. Renish, 35176 Cardiff St.,
Newark, Calif. 94560
Filed Mar. 22, 1965, Ser. No. 441,668
15 Claims. (Cl. 53—316)

This invention relates to improvements in a capping machine and more particularly to a machine for capping cylindrical objects with skirted lids.

Known machines for applying and securing lids to containers comprise many forms. In one form, the lids and the surfaces of the containers to be capped are brought together along converging planes, so that at the junction of the planes, the lid and the container are in contacting relation. More specifically, the containers are conveyed under an inclined chute on which the lids are held in overhanging relation in the path of travel of the containers. As the containers pass under the chute, their leading edge engages the exposed skirt of the lid and pulls it free of the chute. Subsequently, the skirt is pressed over the container in encircling relation and the capping process is accomplished. To ensure that the lids do not leave the chute until engaged by a container, they are releasably held between stops contacting the edges of the lids. The adjustment of the stops is critical, inasmuch as they have to frictionally retain the cap on the chute, and yet release the lid when engaged by a container.

Usually, a supply of lids is held on the chute and as the lowermost one is extracted, the others slide down and take its place. This mode is effective to replace the lids as they are released, but leads to several problems since the lowermost lid has to support the weight of those lids above and still be pulled from between the stops by the container.

To alleviate this objection, the number of lids on the chute has necessarily been kept small and various methods of supplying lids to a chute from a hopper or stack have been employed. Here again, however, the lid being ejected from the stack is also called upon to support the weight of those lids above, which necessitates limiting the height of the stack and consequently limiting the supply of lids, thereby requiring unduly frequent servicing of the machine. Further, while the described method of supplying lids to a container from a chute is quite satisfactory, it is not foolproof and requires some means of inspection for determining when a container is not properly capped.

It is therefore a principal object of the present invention to provide a capping machine which will function automatically with a minimum of attention or servicing.

It is a further object of the present invention to provide a capping machine which can accommodate a large supply of lids and advance them in a smooth and efficient manner to a capping station.

It is a further object of the present invention to provide a supply means for supporting and advancing a relatively large supply of disc-shaped lids on edge so that a major portion of the weight of the lids is supported by the supply means to minimize frictional forces between adjacent lids.

A still further object is to provide a device of the character described which dispenses lids in one-at-a-time order, on demand, from a large supply to a capping means as lids are removed from the latter, the lids being fed from the dispenser to the capping means at a velocity slow enough not to dislodge preceding lids from their proper position in the capping means.

It is another object of the present invention to provide a device capable of automatically detecting and rejecting any uncapped or improperly capped containers coming from a capping station.

It is yet another object of the present invention to provide a device for dispensing individual, circular objects from a column of the same by revolving the column about an inclined axis and ejecting individual circular objects at the lower end thereof.

Fruther objects and advantages of the invention will be apparent as the specification continues, and the new and useful features of my method and apparatus for a capping machine will be fully defined in the claims hereto attached.

The prefered form of my invention is illustrated in the accompanying drawings, forming part of this specification, in which:

FIGURE 1 is a side elevational view of a capping machine constructed in accordance with the present invention and illustrating the relationship of certain features of the invention, with portions broken away for clarity of illustration;

FIGURE 2, a cross-sectional view of the dispenser end of the machine of FIGURE 1 taken substantially along the plane of line 2—2 of FIGURE 1;

FIGURE 3, an enlarged cross-sectional view of the detector illustrated in FIGURE 1 taken substantially along the plane of line 3—3 of FIGURE 1;

FIGURE 4, a plan view of the machine of FIGURE 1;

FIGURE 5, a cross-sectional view taken substantially along the plane of line 5—5 of FIGURE 4;

FIGURE 6, a side elevational view of a modified form of the dispenser portion of the present invention;

FIGURE 7, a cross-sectional view taken substantially along the plane of line 7—7 of FIGURE 6;

FIGURE 8, a view similar to FIGURE 7 but illustrating the parts in another operating position; and FIGURE 9, a vertical section through FIGURE 8 taken substantially along the plane of line 9—9 of FIGURE 8.

While only the preferred forms of the invention are shown, it should be understood that various changes and modifications may be made within the scope of the claims attached hereto without departing from the spirit of the invention.

Referring now to the drawings in detail, the machine for capping cylindrical objects with skirted lids of the present invention consists basically of a capping means 12 formed for releasably supporting generally disk-shaped objects such as skirted lids with at least a portion of their skirts exposed in position to be intercepted by cylindrical objects moving therepast, a dispenser 13 communicating with the capping means 12 and formed for supplying lids in one-at-a-time order thereto for replacing lids on demand, supply means 14 communicating with the dispenser 13 and formed for supporting a plurality of lids and continuously supplying lids to the dispenser, and magazine means 16 adapted for supporting a plurality of groups of lids and formed for inserting the groups intermittently into the supply means 14.

Although the broad application of the present invention is varied, it is particularly useful in the canning industry where it is suited for high-speed application of resealable closures onto containers. It has found particular utility in capping sealed cans with plastic lids, the lids being used to reseal the can after the regular end is removed. It is also particularly useful for placing lids on plastic or paper cups such as those used for ice cream, salads, and so forth.

As here shown, the cylindrical objects to be capped comprise metal can containers 17 common in food processing, and the skirted lids 18 are molded of a flexible plastic to provide a depending skirt or flange 19 which snaps over the container rim to secure the lid in encircling relation thereto. The capping means 12 is of conventional form including an inclined chute 21 provided by a bed 22 having converging guide walls 23 with stops 24 adapted to engage the margins of the lids 18 and releasably hold the lowermost lid on the chute until a container 17 passes thereunder and pulls it free. The flexible plastic of lids 18 allows them to deform enough to be pulled between the stops 24 by the moving container. Where relatively rigid lids are used, the stops can be resiliently positioned, such as by springs, so they could be spread apart by the lid as it is pulled therebetween. The skirt 19 is formed and positioned to be intercepted by the leading edge of the container, as illustrated in FIGURES 1 and 2. After pick-up of the lid 18 by the container 17, the container is transported by conveyor 25 under compression roller 26 or other means for pressing the lid firmly onto the container.

As will be noted, this is a very smooth and efficient manner of applying lids to containers and lends itself to rapid operation. However, certain difficulties arise in replenishing the lids to the capping means or pick-up station. For instance, to accomplish an efficient capping sequence, it is necessary that the lid be supplied to the pick-up station immediately after the preceding lid is extracted. This generally entails having a series of lids supported on chute 21 which will slide down the chute to fill the void left by the preceding lid. Thus, it will be seen that the stops 24 not only must arrest and releasably retain the lowermost lid on the chute in the correct position, but also must support those lids immediately above and prevent them from avalanching off the chute.

As an important feature of the present invention, the dispenser 13 supplies lids automatically to chute 21 in one-at-a-time order to replace the lids thereon so that only a few lids are supported on the chute at any one time. The dispenser 13 is triggered by a signal from a microswitch 27 each time a container passes under the chute. That is, each time a lid is pulled from the chute by a container, the dispenser is actuated to replace the lid and this cycle is repeated at each successive capping operation. The microswitch 27 is conveniently coupled to a suitable source of electrical power (not shown) and to a shoe 28 which wipes over and is deflected by the lid as it is being extracted by the container.

It is important that the dispenser 13 does not deform the lid as it is being dispensed and that it be capable of rapid operation. Further, the lid should not be ejected into the chute with a force which might dislodge other lids from the chute. To accomplish these ends, a moveable feeder member 29 is coupled to the piston rod 31 of air cylinder 32 which is actuated by a solenoid valve 30 in response to a signal from microswitch 27 generated each time a lid being pulled from the chute 21 deflects shoe 28. Thus, the moveable feeder member 29 is adapted for displacing individual lids toward capping means 12 in response to the removal of a lid from the capping means.

The dispenser 13 is preferably positioned above and near to the capping means 12 so that the dispensed lid will fall into the inclined chute 21 by gravity immediately after leaving the dispenser. Similarly, the lids are preferably supported in the dispenser against a substantially vertical plate 33 so as to fall vertically downward onto the chute 21.

The dispenser 13 is also provided with means for controlling the velocity of the lids leaving the dispenser. Looking to FIGURE 2, it will be seen that the dispenser includes the substantially vertical plate 33 and rotating means such as a pair of spaced rolls 37 and 38 adapted to support and spin the lids about a generally horizontal axis. To dispense a lid, the feeder member 29 is extended by actuation of air cylinder 32 and engages the periphery of the spinning lid at 39 so as to displace the lid from the roll 38. It will be noted that the displaced lid is positioned between the roll 37 and the nonrotating feeder member 29, and this tends to flip the lid upwardly. The lid is light enough that the feder member 29 barely has to touch the periphery of the lid to cause the lid to spin upwardly from the position shown and no undue distorting strains are placed on the lid by the action of member 29.

The dispenser 13 also includes a circular track 41 concentric with the roll 37 and spaced therefrom by a distance substantially equal to the diameter of a lid 18. Track 41 is mounted against the vertical plate 33 and has a flange 40 concentric to the track providing circumferentially spaced entrance 42 and exit 43. Entrance 42 is formed and positioned to permit the lids 18 to advance into the track 41 along the rolls 37 and 38 and the exit 43 is adjacent to and overlies chute 21. The lid, traveling upward by the cooperative action of the feeder member 29 and the spinning roll 37, is confined in track 41 and travels around the track in epicyclic fashion so that once again no undue distortive strains are imposed on the lid.

Other types of lids, such as those made entirely or partially of paper and certain of the nesting types, may require a somewhat different type of displacement than that offered by the dispenser of FIGURES 1 and 2. A modified form of the dispenser is illustrated in FIGURES 6 through 9 of the drawings. As here shown, the dispenser 13b utilizes a vertically reciprocating feeder member 29b to eject the lid 18 from its entry position at 39b downward toward the capping means 12. The lids are supported against a vertical plate 33b and by spaced rolls 37b and 38b which are relieved as at 44 (see FIGURE 6) to provide a reduced diameter adjacent plate 33b, thus creating an exit opening large enough to permit a lid approaching plate 33b to pass downwardly between the rolls 37b and 38b into the capping means 12.

The entering lid is initially supported against the vertical plate 33b by an air pressure differential created by a fan 46 having its suction side connected to a conduit 47 opening through the vertical plate 33b in position to pull a partial vacuum between the plate and the lid when the latter is at the position shown in FIGURE 7. The feeder member 29b has a curved contacting face 48 adapted to engage the curved rim of the lid and distribute the force imparted to the lid over a substantial area. The feeder member 29b also carries a plate 49 adapted to close off the conduit 47 and remove the effect of the vacuum fan 46 while the feeder member is displaced downwardly. The feeder member 29b is supported between parallel guideways 51 and 52 for movement therealong upon actuation of an air cylinder 32b in response to a signal from a microswitch 27 in a manner similar to that shown and described with respect to the dispenser of FIGURES 1 and 2. Preferably, part of the air supply used to force the feeder element down is diverted to a line 53 at T-connection 54 for bleeding a stream of air to the curved contacting face 48 of the feeder member, thus acting to break any vacuum between the face 48 and an engaged lid.

A pair of fingers 56 and 57 contacting the margins of the lid serve the dual purpose of initially supporting the end lid at 39b and helping to urge the lid downward after being displaced by the feeder element. As shown in FIGURES 7 and 8, the fingers 56 and 57 are pivotally carried on vertical plate 33b by pins 58, and the inwardly extending portions 59 are urged upward by springs 61. Adjustable screw-type stops 62 are positioned to engage the outwardly extending portions of the fingers for properly positioning the fingers in supporting relation to the end lid, as shown in FIGURE 7. FIGURE 8 illustrates how the interior sweeps 59 of the fingers 56 and 57 contact and press against the upper sector of the displaced lid to urge the same downward.

As an important feature of the present invention, the supply means 14 is adapted for continuously supplying lids to the dispenser 13 for supporting a major portion of the weight of these lids to reduce the frictional engagement between adjacent lids which would otherwise impede the described action of the dispensers 13 or 13b. Thus, the lid 18 entering the dispenser does not have to support the weight of the other lids on the supply means and therefore the force necessary to dispense such lid does not have to overcome a relatively large frictional loading between this lid and the next. Accordingly, the force which must be exerted on the lowermost lid by the feeder member can be reduced, and this substantially eliminates crushing or distorting of even light and flimsy lids as they are being dispensed and insures that the lids will be dispensed rapidly, evenly, and in a uniform manner.

In accordance with the present invention, the dispenser rolls 37 and 38 may comprise the terminal or discharge end of the supply means 14. More specifically, the lids are supported in supply means 14 on edge and in an aligned column having a longitudinal axis which is generally horizontal but is slightly inclined downwardly toward the dispenser 13. Rotation of the column of lids about this inclined axis tends to urge the lids toward the dispenser in helix fashion. As used herein, helix fashion means that the movement of the lids when their path along the axis is not blocked by a preceding lid is such that a point on the rim of the lid describes a helix because of combined axial and rotational movement of the lid. Of course, if the path of the lid is occupied by another lid or if the lid reaches the vertical plate 33 of the dispenser, the axial component of movement will be stopped and the lid will merely rotate in place. The slope of the inclined axis should be such as to support the majority of the weight of the lid and yet insure reasonably rapid longitudinal travel. It has been found that an incline of between 1° and 30° from the horizontal is effective for most lids presently in use.

The rolls 37 and 38 have an elongated cylindrical configuration and are extended from the dispenser far enough to support and rotate a substantial quantity of lids. As here shown, the rolls are conveniently journaled in and extend between the vertical plate 33 of the dispenser 13 and a plate 65 mounted in parallel spaced relation thereto. Plates 33 and 65 are here supported by a frame 63 carrying a motor 64 adapted to rotate the rolls 37 and 38 through pulleys 66 engaged by an endless belt 67. A holddown roller 68 and gate 69 may be provided adjacent the dispenser to hold the lids on the rolls until they are to be dispensed.

To allow the machine to operate for a considerable number of capping operations before requiring attention and yet not have to advance the entire lid supply between each successive capping operation, a magazine means 16 is provided to hold a large number of lids and advance them intermittently in groups onto the rollers 37 and 38 when the supply thereon falls below a predetermined number.

The magazine means 16 here consists of a platform 71 formed for dumping a group or column of lids onto the upper end of the inclined rolls 37 and 38 and an incrementally advanced conveyor 72 formed for resupplying the platform a group at a time. The magazine means 16 is activated when the end of the column of lids on the supply means passes the feeler of a microswitch 73, the switch being actuated to energize an air cylinder 74 through a suitable solenoid valve 75. This swings platform 71 around pivot 70, dumping the group of lids off of the platform and onto the supply means as indicated by arrow 76, see FIGURE 5. Platform 71 preferably is in the form of a V-shaped trough base 77 with upstanding end walls 78 for securely holding the group of lids in proper position to be dumped onto the rolls 37 and 38.

Intermittently advanced conveyor 72 here includes a pair of parallel endless chains 79 and 81 carrying transverse bars 82 which form pockets 83 to hold and convey the groups of lids toward the platform 71. The advancing mechanism 84 for conveyor 72 includes an indexing device 86 for positively positioning the pockets as they are advanced toward platform 71 and obviating accumulation of lineal error. This advancing mechanism 84 contains an air cylinder 87 activated by a microswitch 88 through a suitable solenoid valve 90. The microswitch 88 is positioned at the underside of the platform 71 and is activated thereby each time the platform moves up or down. When the platform 71 moves upwardly to dump its supply of lids, the air cylinder 87 thrusts its piston rod outward and cocks the advancing mechanism 84 while releasing an indexing stop 89. Return of the platform 71 causes microswitch 88 to actuate solenoid valve 90 and reverse the action of air cylinder 87, advancing conveyor 72 until it is halted by the indexing stop 89.

The action of the air cylinder 87 is imparted to the parallel chains 79 and 81 through an idler chain 91 which rotates a one-way slip clutch 92 coupled to one of the sprockets 93 of the parallel chains. The idler chain 91 is coupled at its opposite ends to the piston rod of air cylinder 87 and to a spring 94. Thus, when the piston rod of air cylinder 87 moves outward, the idler chain is retracted by the spring 94 with the clutch 92 disengaged. As the air cylinder reverses and moves the piston rod inward, the idler chain 91 rotates the sprocket 93 through the now-engaged clutch 92. The indexing means 86 stops any further movement of the parallel chains 79 and 81 past a predetermined amount and overcomes the momentum of the conveyor to halt it at the desired position.

The indexing means 86 includes a sprocket 96 (see FIGURE 5) which meshes with the parallel chain 79 and also includes an indexing stop 89 which is constructed to allow the sprocket 96 to rotate through one complete revolution and thereby determine the linear advancement of the magazine conveyor. Indexing sprocket 96 carries an arm 97 which is normally held against rotation by the stop 89. This stop is pivotally mounted for swinging movement into and out of engagement with the arm 97 and is held in engagement with arm 97 by a pin 98 engaging the distal end of the stop. The pin 98 is carried on air cylinder 87 in such manner that as the air cylinder moves outward the pin releases stop 89, and as the air cylinder moves inward, advancing conveyor 72, the pin engages the stop 89, which in turn intercepts arm 97 to halt any further movement of the conveyor.

As a feature of the present invention, sensing means 99 is provided for detecting any uncapped or improperly capped containers after they come from the rollers 26. The containers 17 as herein described are electrically conducting, such as metal cans, and the lids 18 are electrically non-conductive such as plastic or paper.

The sensing means 99 here includes two pair of switch fingers overhanging the path of travel of the containers subsequent to the capping and securing operations. The first pair of fingers 111 and 112 are connected to a suitable supply of electrical energy through leads 113 and 114 and are positioned to engage the capped end of the container. If a lid is in place, the fingers will remain insulated from one another; however, if the lid is missing, the conductive container will engage the fingers to complete the circuit and allow electric pulse to pass through leads 113 and 114. This pulse activates air cylinder 115 through a suitable solenoid valve 116, causing reject member 117 to shove the defective container from the conveyor 25.

To check for caps that are askew or cocked on the container, a second pair of switch fingers 118 and 119 are provided. Fingers 118 and 119 are positioned to just clear a normally placed lid, but to be deflected upwardly by an improperly positioned lid. Fingers 118 and 119 are connected to electrical leads; here one of the leads 114 and cooperating screw contacts 121 and 122 are connected to the lead 113. Thus, as the container passes under the second pair of fingers, if the cap is cocked, one or both of the fingers 118 and 119 will be deflected against the screw contacts 121 and 122 and an electrical pulse will pass through the leads 113 and 114 and actuate reject member 117. If the cap is properly placed, it will clear the fingers 118 and 119 and no contact or pulse will occur and the container will continue on its way.

The first pair of fingers 111 and 112 and each of the second pair of fingers 118 and 119 work independently from each other but are preferably connected in parallel. As shown in FIGURE 3, an insulating block 123 carries both pairs of fingers in proper alignment in spaced relation over the containers. Lead 113 is connected to finger 111 and screw contacts 121 and 122, while lead 114 is connected to fingers 112, 118 and 119. Thus, if any of the described improper conditions are detected by either pair of fingers, the reject member 117 will be activated to remove the improperly capped container.

In order to make the machine more versatile, it is adjustable to accommodate different sizes of containers and lids. The chute 21, compression roller 26, and sensing means 99 are carried in spaced relation above the conveyor 25 on a frame 124 mounted on screw jacks 126 which are raised and lowered by turning cooperating threaded sprockets 127 by means of endless chain 128. A handle 129 is provided to rotate the chain 128. The dispenser 13 and frame 63 of supply means 14 are likewise carried on the frame 124 to permit them to remain in close proximity to the chute. The adjustability extends to having the stops 24 on the chute 21 adjustably carried on right and left-hand threaded blocks 131 which are moved in and out by turning screw shaft 133 with handle 134. The track 41 of dispenser 13 may be changed to accommodate different diameter lids by removing screws 136 and exchanging with an appropriately sized track. Alternatively, the diameter of rotary member 37 could be changed.

The supply means 14 and magazine means 16 will naturally accommodate a wide variance in lid sizes. As can be seen, the spaced inclined rolls 37 and 38 and platform 71 support the lids at two points, which spacing is not critical through the range of probable lid sizes. Similarly, the conveyor 72 will accommodate different sizes of lids.

In operation, the device is adjusted to meet the size requirements of the containers to be capped and lids to be used, and conveyor 72 is loaded with a large number of lids to keep the device in supply for a long duration. The lids progress toward the dispenser 13 through the action of switches 73 and 88 controlling air cylinders 74 and 87 to dump the groups of lids from platform 71 onto the rolls of supply means 14 and then replace the group on platform 71 from conveyor 72. This procedure will be repeated each time the tail end lid on rolls 37 and 38 passes switch 73. The chute 21 generally holds two lids in tandem, so that each time the container picks up a lid, the second lid on the chute slides down and is arrested by the stops 24 in position to be engaged by the next container. Similarly, microswitch 27 is activated by the shoe 28 wiping over the dispensed lid and the pulse therefrom is transmitted to air cylinder 32 to extend feeder member 29 against the periphery of the lid in the dispenser 13, with the lid being dispensed into the chute.

The containers are usually supplied to the conveyor 25 from a previous processing, filling or sealing operation and as such are spaced apart so that a time period is provided between successive containers.

A container, after it has picked up its lid, is conveyed under compression rollers 26, where the cap is securely pressed on. Next, the capped container is conveyed under sensing means 99 where switch fingers 111, 112, 118 and 119 extend down to detect whether the lid has been properly placed on the container. If the lid is missing or not in proper position, the fingers will detect same and cause actuation of reject member 117, which will remove the defective container. If the cap is in proper position, the container will continue on to a packing or other operation.

From the foregoing, it will be seen that I have provided an efficient and automated system for capping containers and the like, requiring a minimum of attention or servicing.

I claim:
1. A machine for capping cylindrical objects with skirted lids, comprising:
   (a) capping means formed for releasably supporting a generally disk-shaped skirted lid with at least a portion of the skirt exposed in position to be intercepted by a cylindrical object moving therepast;
   (b) a dispenser communicating with said capping means and formed for supplying lids in one at a time order thereto for replacing lids on demand;
   (c) supply means communicating with said dispenser and formed for supporting a plurality of lids and continuously supplying lids to said dispenser, with the supply means including first means formed for engaging and freely supporting a column of lids along a generally horizontally extending axis inclined toward said dispenser, said axis being inclined such that a major portion of the weight of each lid in said column is supported by said first means, and second means for rotating said lids about said inclined axis whereby the rotating lids will move down the incline toward the dispenser;
   (d) and magazine means adapted for supporting a plurality of groups of lids and formed for inserting said groups intermittently into said supply means.

2. A machine as described in claim 1 and wherein said supply means has a pair of elongated cylindrical rolls spaced apart for rotatably supporting a lid standing on edge therebetween for movement along said rolls with the center of the lid following a line inclined downwardly toward said dispenser, and means for rotating said lid on said rolls so as to cause said lid to move toward said dispenser.

3. A machine for capping cylindrical objects with skirted lids, comprising:
   (a) capping means formed for releasably supporting a generally disk-shaped skirted lid with at least a portion of the skirt exposed in position to be intercepted by a cylindrical object moving therepast;
   (b) a dispenser communicating with said capping means and formed for supplying lids in one at a time order thereto for replacing lids on demand;
   (c) supply means communicating with said dispenser and formed for supporting a plurality of lids and continuously supplying lids to said dispenser, said supply means having a pair of elongated cylindrical rolls formed to support a column of lids in coaxially aligned relation between said rolls with the axis of said column inclined downwardly toward said dispenser, said rolls being journaled in parallel spaced relation to one another and to the path of movement of said column of lids therealong;
   (d) magazine means adapted for supporting a plurality of groups of lids and formed for inserting said groups intermittently into said supply means as said column is depleted;
   (e) and means for rotating said rolls in the same direction and at substantially the same speed so as to rotate the column of lids and cause said lids to move down said inclined axis toward said dispenser.

4. A device for continuously supplying generally disk-shaped objects in one at a time order to a desired location along a path coincident with the axes of revolution of said objects, comprising:
   (a) a pair of elongated cylindrical rolls spaced apart to support upstanding disk-shaped objects therebetween, with the axes of revolution of said objects lying on a line inclined downwardly toward said desired location;
   (b) and means for spinning said disk-shaped objects about their axes of revolution so as to cause said objects to move along said rolls toward said desired location.

5. A device for conveying disk-shaped objects comprising:
(a) a pair of elongated cylindrical rolls spaced apart to engage and support a column of disk-shaped objects therebetween along an inclined axis, said inclined axis having a slope such that a major portion of the weight of each disk-shaped object in said column is supported on said rolls;
(b) and means for rotating said rolls about their respective axes wherein the disk-shaped objects will be rotated to urge them along the said inclined axis in helix fashion.

6. A machine for capping cylindrical objects with skirted lids, comprising:
(a) capping means formed for releasably supporting a generally disk-shaped skirted lid with at least a portion of the skirt exposed in position to be intercepted by a cylindrical object moving therepast;
(b) a dispenser communicating with said capping means and formed for supplying lids in one at a time order thereto for replacing lids on demand;
(c) supply means communicating with said dispenser and formed for supporting a plurality of lids and continuously supplying lids to said dispenser;
(d) magazine means adapted for supporting a plurality of groups of lids and formed for inserting said groups intermittently into said supply means, said dispenser having a movable feeder member adapted for displacing individual lids toward said capping means;
(e) and control means operative in response to removal of a lid from said capping means to effect movement of said feeder member.

7. A machine as described in claim 6 and wherein said dispenser is formed to support a column of said lids with each lid in upstanding attitude, and said feeder member is adapted for engaging the periphery of the lid at an end of said column and urging such lid laterally from the column into said capping means.

8. A machine as described in claim 7 wherein said dispenser is positioned above said capping means and is formed so that the lids urged from the column by said feeder member will drop into said capping means, said capping means including retarding means for controlling the velocity of the lids dropping into the capping means so as not to dislodge the said lid releasably supported with a portion of its skirt exposed in position to be intercepted by a cylindrical object moving therepast.

9. In a machine for capping cylindrical objects with generally disk-shaped skirted lids, comprising:
(a) a circular track having an entrance and a circumferentially spaced exit, said entrance being formed to permit a lid presented flat thereto to enter said circular track, said exit being formed to permit lids to drop from said circular track in one-at-a-time order;
(b) and a rotatable member concentric with said circular track and formed for spinning a lid entering the circular track through said entrance around said track to said exit.

10. In a machine for capping cylindrical objects with generally disk-shaped skirted lids, comprising:
(a) a circular track having an entrance for lids and a circumferentially spaced exit for lids;
(b) a rotatable member mounted adjacent to said circular track and formed for engaging and spinning a lid around its axis of revolution and advancing such lid along said axis and into said circular track through said entrance;
(c) and rotating means for spinning said lid around said circular track from said entrance to said exit.

11. The device described in claim 10 and wherein said rotating means includes a circular member concentrically journaled within said circular track with the outer periphery of said circular member spaced from the inner periphery of said circular track by a distance substantially equal to the diameter of said lid whereby said lid will be spun around said circular track in epicyclic fashion.

12. A machine for capping cylindrical objects with skirted lids, comprising:
(a) capping means formed for releasably supporting a generally disk-shaped skirted lid with at least a portion of the skirt exposed in position to be intercepted by a cylindrical object moving therepast;
(b) a dispenser communicating with said capping means and formed for supplying lids in one at a time order thereto for replacing lids on demand;
(c) supply means communicating with said dispenser and formed for supporting a plurality of lids and continuously supplying lids to said dispenser;
(d) magazine means adapted for supporting a plurality of groups of lids and formed for inserting said groups intermittently into said supply means, said magazine means being formed for inserting one of said groups of lids into said supply means in response to a signal generated by the end of the previous group of lids passing a predetermined point in said supply means;
(e) and signal means in said supply means formed for detecting said end of the previous group of lids and supplying said signal.

13. A capping machine, comprising:
(a) a conveyor formed for advancing a row of cylindrical top containers to be capped along a predetermined path of travel;
(b) an inclined chute having means for supporting a generally disk-shaped skirted lid in overhanging relation in said path of travel of the containers with the skirt of the lid in position to be intercepted by the top of the next container for applying lids to the tops of the containers as they move past said chute;
(c) means cooperative with said chute for pressing the intercepted lid onto the container top;
(d) sensing means overlying the path of the containers downstream of said chute and formed for detecting improperly capped containers;
(e) a frame supporting said inclined chute and said pressing means and said sensing means in adjustably spaced relation with respect to said conveyor whereby different sized containers may be accommodated;
(f) reject means commanded by said sensing means and formed for removing said improperly capped containers from said row of containers on said conveyor;
(g) a dispenser communicating with said capping means and formed for supplying lids in one at a time order to the latter for replacing lids as they are removed from said inclined chute;
(h) and supply means communicating with said dispenser means and formed for supporting a plurality of lids and continuously supplying lids to said dispenser.

14 A device for sensing improperly capped containers standing with their capped ends uppermost and moving in a row along a predetermined path wherein the container is electrically conductive and the lid is electrically non-conductive, comprising:
(a) a first pair of switch fingers overhanging and extending into the path of travel of the containers at the capped end thereof and adapted to detect the presence of a lid on a container passing thereunder by electrically conducting across the conductive container in the absence of a non-conducting lid;
(b) a second pair of switch fingers overhanging the path of travel of the containers having cooperating switch terminals normally spaced from each switch finger and adapted to detect improperly positioned lids on containers passing thereunder;
(c) said second pair of switch fingers positioned to clear the opposite edges of normally placed lids and be deflected into contacting relation with their switch terminals by lids askew on the containers;

(d) the first pair and each of the cooperating terminals and switch fingers of the second pair connected in parallel to opposite poles of an electrical potential wherein upon detection of any of the undesirable conditions of said lid an electrical signal is emitted.

15. A device as defined in claim 14 and having reject means formed to remove defectively capped containers in response to said electrical signal.

References Cited

UNITED STATES PATENTS

| | | | |
|---|---|---|---|
| 2,386,797 | 10/1945 | Hohl | 53—316 |
| 2,734,673 | 2/1956 | Hazel | 53—316 |
| 3,214,887 | 11/1965 | Weller | 53—316 |

RICHARD H. EANES, JR., *Primary Examiner.*